United States Patent [19]

Jullien et al.

[11] Patent Number: 5,343,521
[45] Date of Patent: Aug. 30, 1994

[54] DEVICE FOR PROCESSING ECHO, PARTICULARLY ACOUSTIC ECHO IN A TELEPHONE LINE

[75] Inventors: Jean-Pascal Jullien, Pleumeur-Bodou; Grégoire Le Tourneur, St-Quay-Perros, both of France

[73] Assignee: French State, represented by the Minister of the Post, Telecommunications and Space, (Centre National d'Etudes des Telecommunications), Issy-Les Moulineaux, France

[21] Appl. No.: 678,282
[22] PCT Filed: Aug. 20, 1990
[86] PCT No.: PCT/FR90/00621
§ 371 Date: Apr. 16, 1991
§ 102(e) Date: Apr. 16, 1991
[87] PCT Pub. No.: WO91/03116
PCT Pub. Date: Mar. 7, 1991

[30] Foreign Application Priority Data

Aug. 18, 1989 [FR] France .................. 89 11026

[51] Int. Cl.⁵ .............................. H04M 9/08
[52] U.S. Cl. .................. 379/410; 379/411; 379/409; 379/406; 370/32.1
[58] Field of Search ............... 379/390, 391, 392, 410, 379/411, 409, 406, 407; 370/32.1

[56] References Cited

U.S. PATENT DOCUMENTS

| 3,499,999 | 3/1970 | Sondhi | 379/410 |
| 4,129,753 | 12/1978 | Duttweiler | 379/410 |
| 4,712,235 | 12/1987 | Jones, Jr. | 379/410 |
| 4,782,525 | 11/1988 | Sylvain et al. | 379/345 X |
| 4,984,265 | 1/1991 | Connan et al. | 379/390 |

FOREIGN PATENT DOCUMENTS 2202717 9/1988 United Kingdom ............... 379/410

Primary Examiner—James L. Dwyer
Assistant Examiner—Paul A. Fournier
Attorney, Agent, or Firm—Lowe, Price, LeBlanc & Becker

[57] ABSTRACT

The device comprises an echo cancelling circuit receiving a first signal and a second signal and a real echo between channels for producing a third signal containing the second signal and a difference between the real echo and the estimated echo. Detectors detect the echo difference and the second signal in the third signal when the level of the third signal exceeds a predetermined threshold. Circuits gain-control the adaptation in the adaptive filtration of the echo cancelling circuit in such a way as to modify the adaptation gain when the second signal is not detected and to prohibit all filtration modifications as long as the second signal is detected. For instance, for an acoustic echo in a telephone set, the echo is not processed when the third signal contains a local speech signal as second signal.

20 Claims, 3 Drawing Sheets

DEVICE FOR PROCESSING ECHO, PARTICULARLY ACOUSTIC ECHO IN A TELEPHONE LINE

BACKGROUND OF THE INVENTION

1. Field of the Invention

The present invention relates to the processing of an echo between two transmission channels with a coupling between them.

2. State of the Prior Art

In particular, the invention is destined to suppress acoustic echo in a telephone set or other telephone terminal of the hands-free type. As shown in FIG. 1, the set has one or several loudspeakers HP as well as one or several microphones MI, all fixed. The acoustic echo is the signal picked up by the microphone(s) of the set coming from the loudspeaker(s) by acoustic coupling. This coupling can be due to solid-state or aerial transmission; in the latter case, the environment of the terminal plays a decisive role.

An echo processing device DT is interconnected in the reception channel of the set receiving a received signal RECU from the subscriber telephone line LT and transmitted as a signal DIFFUSE broadcast by loudspeaker(s), and in the emission channel of the set transmitting a microphonic signal picked up by the microphone(s) and transmitted as an emitted signal EMIS in the line LT. The microphonic signal is the sum of the local speech signal coming from the local subscriber and an acoustic echo coming from the loudspeaker(s).

For transmission terminals such as hands-free set and group or teleconference terminals, the acoustic echo can cause considerable inconvenience to the far end speaker, particularly in the case of long transmission periods between the local subscriber and the speaker via the telephone network. The decrease of this echo to a satisfactory level in the emitted signal EMIS constitutes the main purpose of the echo processing device DT.

Conventionally, according to a first known embodiment, a device DT uses gains switching between the channels to considerably weaken the echo. Variable gains are applied to the reception and emission signals to globally ensure a corrective gain which reduces the value of the acoustic coupling. This introduces a hindrance into the conversation caused by the transmission of the signals in the line LT close to the half-duplex mode.

To avoid this, a second type of echo processing device uses the adaptive identification technique which carries out an echo cancellation by subtraction of an echo estimated on the basis of an estimation of an acoustic coupling pattern. The cancellation performances therefore depend directly on the quality of estimation of the acoustic coupling. The nature of the acoustic coupling requires that the pattern take into account a large number of acoustic reverberations caused by the environment of the set.

The device must estimate an important fraction of the impulse response representing the acoustic coupling. The conventional algorithms of adaptive identification do not work for "long" impulse responses of more than ten milliseconds. Local speech is seen as a noise by the algorithm and considerably perturbs identification. The algorithm can also distort local speech which should ideally be transmitted undisturbed. The environment of the set is variable, due e.g. to the movement of the people in the vicinity of the set, and the algorithm must "follow these changes" in order to remain efficient.

OBJECT OF THE INVENTION

The present invention aims to remedy the preceding disadvantages of the prior art by using a particular management of the echo identification algorithm in an echo canceller in order for this identification not to disturb the local speech in the emitted signal.

SUMMARY OF THE INVENTION

Accordingly, a device for processing a real echo between first and second transmission channels, comprising echo cancellation means receiving a first signal in the first channel and a second signal and the real echo in the second channel for producing a third signal containing said second signal and a difference between said real echo and an estimated echo, said estimated echo resulting from a real echo identification by adaptive filtration from the first and third signals, is characterized in that it comprises means for detecting in the third signal said echo difference and said second signal when the level of the third signal is greater than a second predetermined threshold, and means for gain-controlling the adaptation in the filtration of the echo cancelling means thereby modifying the adaptation gain when said second signal is not detected and prohibiting any filtration modification as long as said second signal is detected.

The echo cancellation is therefore only managed when the signal picked up by the microphone(s) for a telephone terminal of the hands-free type is solely comprised of an acoustic echo and when there is therefore no local subscriber speech. To do so, the detecting means must distinguish between the second signal and an echo residue in the third signal so as to signal whether the level detected in the third signal is due to a poorly cancelled echo or to a speech signal and/or room noise. The detecting means uses comparisons between the first and third signals and first and second thresholds according to features of the invention. At least one of these thresholds can be variable and can depend on a state of convergence of the echo identification algorithm.

The invention also aims to control the gains of the first and third signals not as a function of a comparison of the levels of these signals, but as a function of the absolute values of these signals, and more particularly of comparisons of the envelopes of these signals with respective predetermined thresholds. Accordingly, an echo processing device embodying the invention comprises, in addition, a first variable attenuator in the first channel for attenuating the first signal, a second variable attenuator in the second channel for attenuating the third signal, and means for controlling the attenuations in the attenuators as a function of the results of independent comparisons between the first signal and a first threshold and between the third signal and the second threshold made by the detecting means.

BRIEF DESCRIPTION OF THE DRAWINGS

Further features and advantages of the invention will be apparent from the following particular description of several preferred embodiments of this invention as illustrated in the corresponding accompanying drawings in which.

DESCRIPTION OF THE PREFERRED EMBODIMENTS

Figure 1:
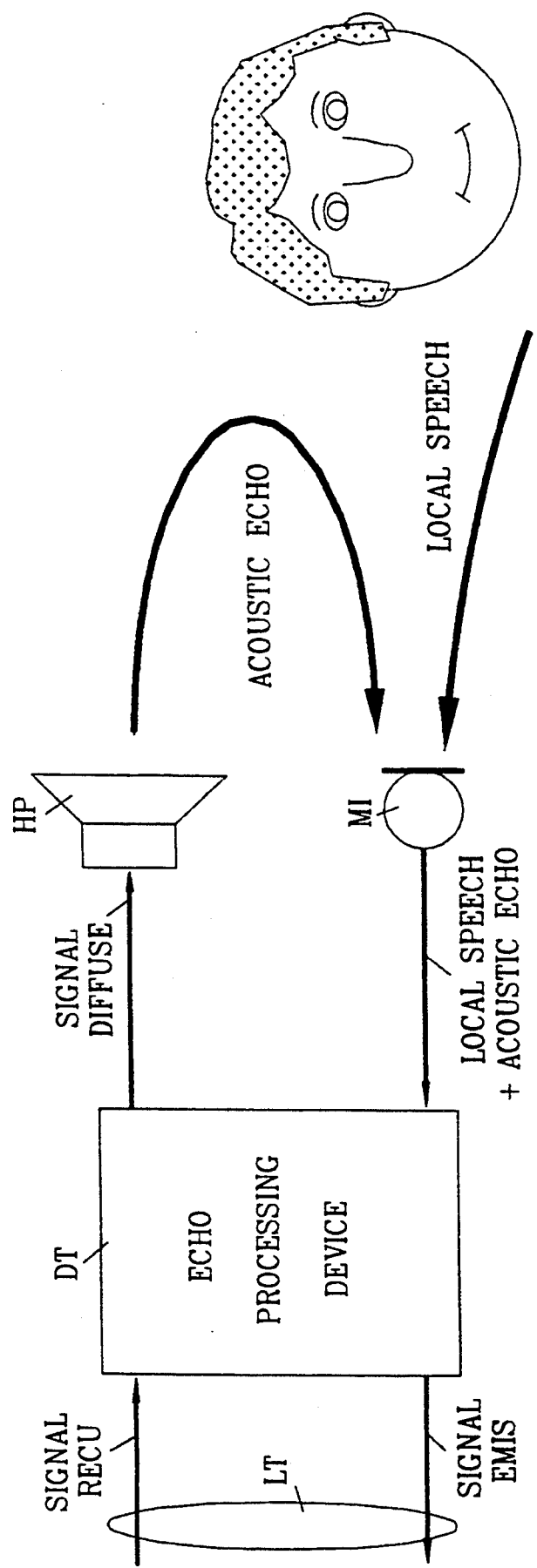
FIG. 1 is a principle diagram of the processing of an acoustic echo in a telephone set.
Figure 2:
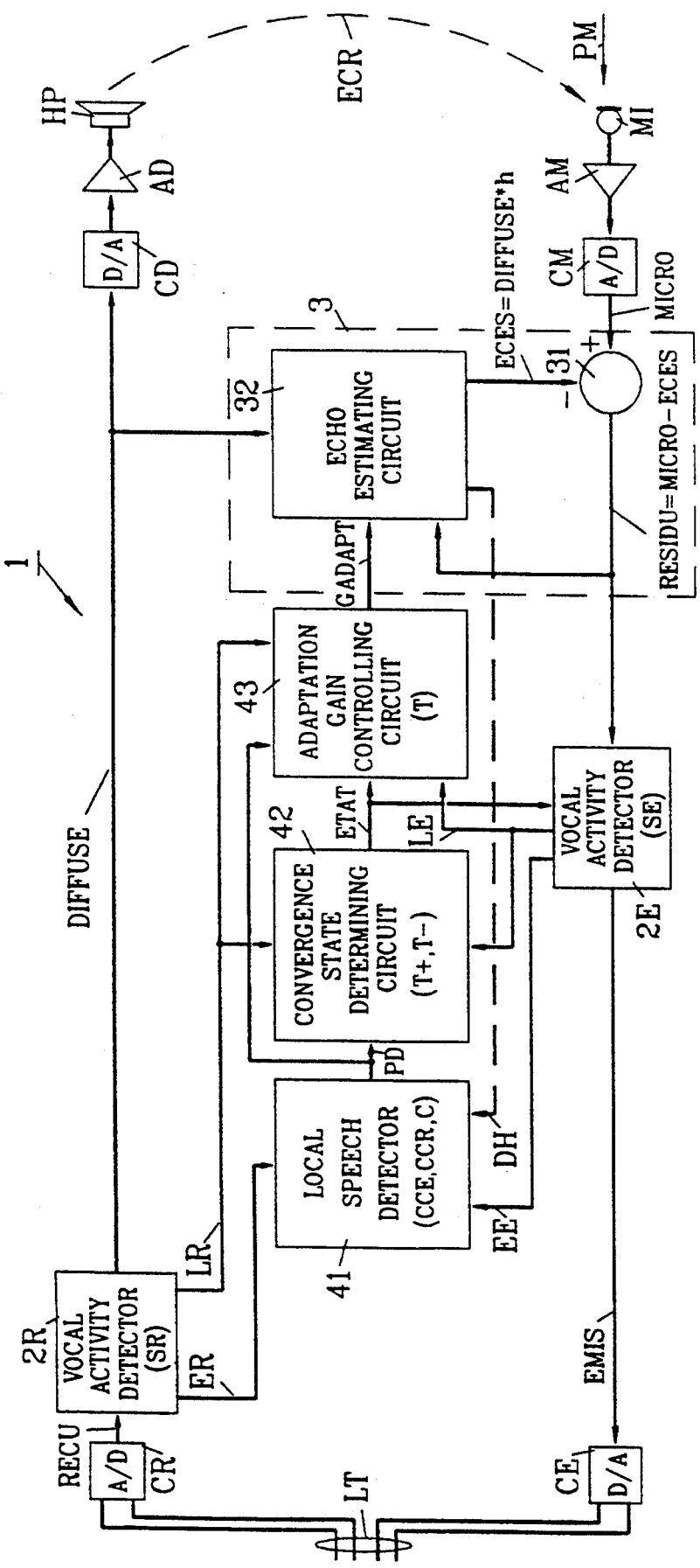
FIG. 2 is a block diagram of an echo processing device according to a first embodiment of the invention.
Figure 3:
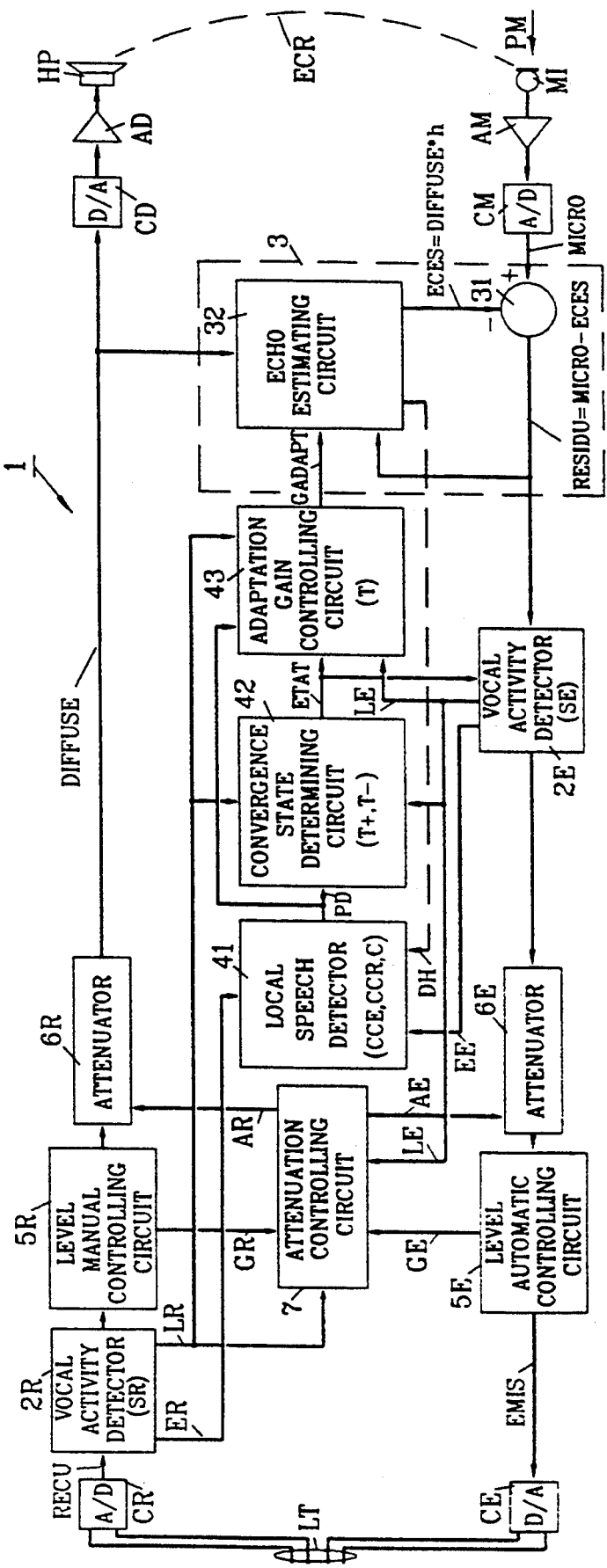
FIG. 3 is a block diagram of an echo processing device according to a second embodiment of the invention.

The embodiments referred to hereinunder are those illustrated in FIGS. 2 and 3 which relate to the processing of a particular echo, such as the acoustic echo between a loudspeaker HP—or plural loudspeakers connected in parallel—and a microphone MI—or plural microphones connected in parallel—of a telephone set or other similar terminal of the hands-free type. The set is connected to a 4-wire telephone line LT according to FIG. 2, or to a 2-wire line via a differential coupler.

The echo processing device 1 comprises a first transmission channel, called reception channel, which receives a signal RECU from a distant subscriber via the telephone network and the subscriber telephone line LT for retransmitting a signal DIFFUSE to be broadcast by the loudspeaker HP. A second transmission channel constitutes an emission channel of opposite direction to the reception channel in the device 1. The second channel receives a microphonic signal MICRO which is picked up by the microphone MI and which is comprised of a real acoustic echo signal ECR and/or a local subscriber speech signal PM. The emission channel retransmits a signal EMIS to the telephone line LT in which the echo signal is highly attenuated or even virtually suppressed.

In practice, the device 1 processes the aforesaid signals in digital form. The device 1 therefore comprises two analog-to-digital converters CR and CM materializing inputs of the reception and emission channels, and two digital-to-analog converters CD and CE materializing outputs of the reception and emission channels, respectively. Two amplifiers AD and AM can be provided between the output of the converter CD and the loudspeaker HP, and between the microphone MI and the input of the converter CM, respectively. The converters operate with a sampling frequency Fe equal to 8 kHz for speech signals in narrow band, or at 16 kHz for speech signals of higher fidelity in wider band.

In the device 1 shown in FIG. 2, the reception channel comprises a vocal activity detector 2R receiving the digital signal RECU from the output of the converter CR and having an output connected to the loudspeaker HP via the converter CD and the amplifier AD. The emission channel comprises, according to FIG. 2, a subtracter 31 and another vocal activity detector 2E. A direct input (+) of the subtracter 31 is connected to the output of the microphone MI via the amplifier AM and converter CM. An output of the subtracter 31 is connected to an input of the signal RESIDU of the detector 2E. The digital signal EMIS is transmitted by an output of the detector 2E into the line LT via the converter CE.

An inverse input (−) of the subtracter 31 is connected to the input of the converter CD receiving the signal DIFFUSE, via an echo estimating circuit 32. The estimating circuit 32 also receives the signal RESIDU from the output of the subtracter 31, so the circuits 31 and 32 constitute a control loop similar to that of an echo canceller 3. However, as will be seen hereinunder, the echo estimating circuit 32 does not only comprise a simple self-adaptive transfer filter.

As shown in FIG. 2, the echo processing device 1 comprises, in addition, three circuits 41, 42 and 43 proper to the invention for controlling the identification speed of the echo in the circuit 32 as a function of the signals RECU and RESIDU and of logic signals LR and LE derived by the detectors 2R and 2E.

For memory, the purpose of a self-adaptive digital transversal filter, such as the one included in the circuit 32, is to produce an echo signal ECES estimated from samples of the signal DIFFUSE and from samples of the signal RESIDU in order for it to be as close as possible to the real echo signal ECR picked up by the microphone MI and resulting from the acoustic backlooping between the loudspeaker HP and the microphone.

The transversal filter is characterized by a predetermined number I of correlation coefficients $h^i_n$, where i is an integer designating a coefficient of index lying between 1 and I, and n is an integral index designating a same instant from a reference instant. In practice, the instants ... n−1, n, n+1, ... are at the sampling frequency Fe of the signals DIFFUSE and RESIDU, but the different variables calculated in the circuits 2E, 2R, 32 and 41 to 43 are updated every millisecond as a function of the signals RECU, DIFFUSE and MICRO and consequently RESIDU.

Conventionally, the processing device does of course comprise a time base, preferably remote-powered by the current in the line LT, for producing various clock signals required for the operating of the aforesaid circuits.

The coefficients $h^1_n$ to $h^I_n$ represent a correlation function $h_n$ at the instant n, of which the convolution with the signal DIFFUSE, represented by the samples of the latter at the I instants preceding the instant n, forms the estimated echo signal ECES. When the estimated signal ECES has reached approximately 90% of the real echo signal ECR, and when the signal RESIDU is consequently virtually nil—in the absence of a microphonic speech signal PM=0—, the filter has "converged". The filter is thus characterized by a transfer function which defines a convergence time between the instant when the coefficients $h^i$ are initially at zero and the instant when these coefficients reach limiting values corresponding to a signal RESIDU=ECR−ECES, also called error signal, having a minimal amplitude. The invention mainly aims therefore to act on this convergence time, and more precisely on the "state of convergence" ETAT of the filter meaning a state more or less distant from the correlation coefficients $h^i$ by comparison with their limiting value. If the circuits 41, 42 and 43 increase the increments of the coefficients $h_i$, the convergence time decreases and the convergence accelerates; this is carried out when the signal RESIDU is high, particularly when speech is resumed after a long silence. On the contrary, the circuits 41, 42 and 43 decide to decrease the increments of the coefficients $h^i$, i.e., to increase the convergence time, when the signal RESIDU is very close to its minimal amplitude.

The echo estimating circuit 32 thus estimates the echo ECES by a conventional adaptive echo identification algorithm, like the variance-standardized stochastic gradient. To obtain sufficient attenuation of the echo ECR for the device to operate properly, as the echo ECR can be higher that the local microphonic speech level, the acoustic coupling between the transducers HP and MI must be identified on a impulse response of several tens of milliseconds. Such a length requires a special mechanism to control the identification algorithm proper to the invention.

The algorithm is controlled by a parameter GA-DAPT supplied by the circuit 43. The parameter GA-DAPT is a multiplicative factor of the standardized gain, dependent on the variable ETAT. The value of this factor, when it is other than zero, controls the adaptation speed, and stops the identification when it is equal to zero.

On an input connected to the reception channel, the circuit 32 comprises means for estimating the variance Var(DIFFUSE) of the signal DIFFUSE. Then an arithmetic unit in the circuit 32 calculates each of the correlation coefficients $h^i_n$ of the filter at each instant n according to the relation:

$$h^i_n = h^i_{n-1} + GADAPT(ETAT) \cdot DIFFUSE_{n-1} \cdot RESIDU_n/(Var(DIFFUSE)_{n-1} \times I)$$

where $RESIDU_n = MICRO_n - (DIFFUSE_{n-1} * h_{n-1})$, the sign * indicating the convolution operation.

The vocal activity detectors 2R and 2E detect the presence of signals in the reception and emission channels by comparison with respective thresholds SR and SE. The detectors 2R and 2E are independent.

However, at least one of the detectors, such as the detector 2E in the emission channel according to FIG. 2, has the respective decision threshold SE which depends on the state of convergence of the filter in the circuit 32. This state of convergence designated by the variable ETAT is more precisely defined further on. This variable ETAT can develop continuously or discretely. It will be supposed hereinunder that the variable ETAT develop in a discrete manner and has 8 integral values 1 to 8.

The first detector 2R calculates the envelope ER of the received signal and compares it with the threshold SR which is presumed constant, though according to another embodiment it can depend on the variable ETAT. If $L_{dB}$ designates an average speech level, e.g. −40 dB with respect to the peak value in a coder of a digital-to-analog converter CR, CM, the threshold SR is preferably equal to $L_{dB} - 6$ dB. The threshold $L_{dB}$ is selected to avoid distortions during the analog-to-digital conversion in the converters CR and CM. The received envelope variable ER is deducted from the following recurring operation carried out by the detector 2R:

$$ER_n = ER_{n-1} + (|RECU_n| - ER_{n-1})/256$$

A value 256 of the integration constant is selected in order to obtain suitable smoothing of the envelope ER of the signal RECU and to avoid all sudden variation in the latter. Depending on the signal ER, the detector 2R supplies a logic signal LR of which the state "1" indicates the presence of a speech signal in the reception channel, at output of the analog-to-digital converter CR, i.e., LR = "1" if ER > SR.

The second detector 2E carries out similar operations to those of the detector 2R, except that the threshold SE in dB depends on the variable ETAT supplied by an output of the convergence state determining circuit 42, according to the table below:

| ETAT | 1 | 2 | 3 | 4 | 5 | 6 | 7 | 8 | 9 |
|------|---|---|---|---|---|---|---|---|---|
| SE | $L_{dB}+40$ | $L_{dB}+6$ | $L_{dB}+4$ | $L_{dB}+2$ | $L_{dB}$ | $L_{dB}-2$ | $L_{dB}-4$ | $L_{dB}-6$ | $L_{dB}-8$ |

For the most convergent state, ETAT=8, the threshold SE is equal to $SR=L_{dB}-6$. The value ETAT=9 does not really exist, but is necessary due to the relation LE(ETAT+2)="0" presented hereinunder with regard to the developments of the variable ETAT.

The envelope EE of the signal RESIDU in the emission channel, and the corresponding logic signal LE indicating in the state "1" the presence of a speech signal being transmitted are deducted from the following relations:

$$EE_n = EE_{n-1} + (|RESIDU_n| - EE_{n-1})/256;$$

$$LE(ETAT) = \text{"1"} \text{ if } EE_n > SE(ETAT).$$

The envelope signals ER and EE are applied to the speech detector circuit 41, and the logic signals LR and LE are applied to both the state of convergence state determining circuit 42 and the adaptation gain controlling circuit 43.

The logic signal LE produced by the detector 2E indicates in the state "1" the presence of a signal RESIDU without distinguishing the two component signals in the latter, an echo difference ECR−ECES and the microphonic speech signal PM. If LE="1" is due to a poorly cancelled acoustic echo ECR−ECES≠0, the identification of the echo must be improved and then the algorithm in the circuits 42 and 43 must be pursued. If, on the contrary, LE="1" is due to the effective presence of a microphonic speech signal PM, the circuit 41 stops, according to the invention, the echo identification in the circuit 42; indeed, if, on the other hand, such a stopping is not carried out according to the prior art, the coefficients of the filter in the canceller would continue to develop, which would distort the speech PM and therefore disturb the identification of the echo itself subsequent to the control loop.

Two methods are envisioned according to the invention for detecting local microphonic speech PM in the signal RESIDU when LE="1".

According to a first detection method, it should be remarked that the envelopes of the signals RECU and RESIDU are always positively correlated in the short-term. A very weak short-term correlation of the envelopes, e.g. below a set predetermined threshold CO, thus indicates the presence of local speech. The first method can be embodied as follows. The circuit 41 calculates variables CCR and CCE as a function of the envelope signals ER and EE issued by the detectors 2R and 2E according to the following recurring relations:

$$CCR_n = CCR_{n-1} + (ER_n - CCR_{n-1})/2048;$$

$$CCE_n = CCE_{n-1} + (EE_n - CCE_{n-1})/2048$$

in order to deduce from them a correlation coefficient such that:

$$C_n = C_{n-1} + [(ER_n - CCR_n)(EE_n - CCE_n) - C_{n-1}]/256.$$

A logic signal PD="1" is transmitted by the circuit 41 to the circuit 42 when the speech PM is detected, which implies $C_n < C0$. For instance, the threshold C0 is equal to $-10^{2(LdB-24)/20}$.

According to a second method for detecting microphone speech, the modulus DH of the correction vector dh is evaluated for the standardized identification algorithm at each stage, i.e., at the instant $n: h_n = h_{n-1} + dh$. The short-term correlation of the envelope of the modulus DH with the envelope ER of the signal RECU is also compared with a predetermined threshold in order to know whether the signal RESIDU is due to an echo variation or to a local speech. A high value of the correlation indicates an echo variation, and a low value indicates the presence of a local speech. In this instance, the connection EE between the circuits 2E and 41 is replaced by a connection DH between the circuits 32 and 41, as shown by the dotted line in FIG. 2.

As previously stated, the state of convergence ETAT supplied by the circuit 42 indicates the proximity of the estimated vector $h_n$ to an ideal vector $h'_n$ which represents the start of the impulse response of the acoustic coupling. This state of convergence develops indirectly as a function of the instantaneous values of the signals RECU and RESIDU. These instantaneous values are not directly utilizable: the signal RESIDU can be due as to a poorly cancelled acoustic echo as to local speech.

Ideally, the acoustic echo ECR should not trigger the vocal activity detector 2E of which the threshold SE depends on the variable ETAT. If it does trigger it, i.e., if LE="1" and PD="0", the variable ETAT must be decreased in order to decrease the sensitivity of the detector 2E and therefore increase the threshold SE, thereby finally restarting the adaptation by the circuit 43. Inversely, if the acoustic echo ECR does not trigger the detector 2E, i.e., if LE="0", for a threshold at a higher state, e.g. ETAT+2 when the variable ETAT has a discrete development, while the variable ETAT is gradually increased in order to lower the threshold SE and to have the vector $h_n$ converge towards the ideal vector $h'_n$.

When the variable ETAT develops step by step, the two previous situations are represented by the incrementation carried out every millisecond on the values $T_-$ and $T_+$ of two internal counters in the circuit 42 as follows:

if PD="0" and LR="1" and if LE(ETAT)="1", then $T_- = T_- + 1$ and $T_+ = 0$;

if LR="1" and if LE(ETAT+2)="0", then $T_+ = T_+ + 1$, PD therefore being at "0".

The counts $T_-$ and $T_+$ are restricted to a maximum count TMAX causing resetting of the two counters and modification of the variable ETAT, in this instance included between 0 and 9.

if $T_- >$ TMAX, then ETAT=ETAT−1, $T_+ = 0$, and $T_- = 0$;

if $T_+ >$ TMAX, then ETAT=ETAT+1, $T_+ = 0$, and $T_- = 0$.

The time-outs ensure the stability of the variable ETAT, and must be limited to enable a sufficiently fast resumption of convergence. In practice, the modification of the variable ETAT takes place every 400 updatings of the other variables, i.e., TMAX=400 ms.

As soon as speech is detected, PD="1", the first counter is reset: $T_- = $"0".

When the variable ETAT develops continuously, the two previous situations are represented by the value $T_c$ of an internal counter in the circuit 42, which is determined as follows:

if LR="1" and if LE(ETAT)="1", then $T_c = T_c + 1$;

if $T_c >$ TMAX then the variable ETAT is decremented: ETAT=ETAT−1;

if LR="1" and if LE(ETAT)="0", then the variable ETAT is incremented: ETAT=ETAT+1 and $T_c = 0$.

Likewise, if speech is detected, PD="1", then $T_c = 0$.

The adaptation gain controlling circuit 43 stops the adaptation in the presence of local speech PM to avoid distorting it, i.e., as soon as the detector 2E is triggered, i.e., LE="1" and PD="1". This momentary stoppage of adaptation is only possible because the acoustic echo ECR alone does not actuate the detector 2E. The filter in the circuit 32 must thus sufficiently attenuate this echo, and the higher the state of convergence the better the device 1 operates. When the state of convergence is poor, e.g. ETAT=1, upon turning on the device, the stoppage constraints are very loose in order to quickly reach the best states of convergence. A time-out process, using the count T of an internal counter included in the circuit 43, is provided to avoid resuming the adaptation during short silences in the local microphonic speech PM. This problem can be overcome by estimating the silences between syllables to be shorter than T0=200 ms.

The circuit 43 carries out the following operations:

if LE(ETAT)="1" then T=0, otherwise if LR="1" then T=T+1;

if T>T0 and LR="1", the adaptation is valid and GADAPT depends on the variable ETAT according to the table below, otherwise GADAPT is zeroized when the adaptation is not valid.

Theoretically, the residual echo ECR-ECES after convergence is proportional to the adaptation gain of the identification algorithm GADAPT. This gain is therefore a function of the state of convergence ETAT, and decreases when the latter increases.

For instance, when the variable ETAT develops step by step, the values of GADAPT are as follows:

| ETAT | 1 | 2 | 3 | 4 | 5 | 6 | 7 | 8 |
|---|---|---|---|---|---|---|---|---|
| GADAPT | 0.25 | 0.25 | 0.125 | 0.125 | 0.0625 | 0.0625 | 0.03125 | 0.03125 |

Though the echo processing device according to FIG. 2 has been described particularly for its insertion in a telephone set, at the end of a subscriber telephone line, this device can be introduced as an echo suppressor in any telephone line, e.g. near a transformer or differential coupler between a 4-wire line section and a 2-wire line section. The echo is then then a part of the signal transmitted in one direction, and said one-direction-transmitted-signal part is added to the signal transmitted in the other direction via the transformer or differential coupler.

In reference now to FIG. 3, an echo processing device also comprises, in addition to the circuits 2R, 2E, 31, 32 and 41 to 43 described above, two vocal signal level controlling circuit 5R, 5E and variable attenuator 6R, 6E assemblies respectively associated with the reception and emission channels and cooperating with an attenuation controlling circuit 7.

The circuits 5R and 6R are connected in series between the output of the vocal activity detector 2R and the inputs of the digital-to-analog converter CD and of the echo estimating circuit 32. The circuits 5E and 6E are connected in series between the output of the signal RESIDU of the detector 2E and the input of the digital-to-analog converter CE.

The circuit 5E is an emission level automatic controlling circuit that "standardizes" the level of the signal EMIS via the converter CE so as to ensure the far end speaker a correct level of reproduction; the far end speaker does not necessarily have a reproduction level adjusting means, such as the circuit 5R. In the case of a hands-free set, the positioning of the speaker with regard to the microphone(s) MI can cause the level picked up by the microphone(s) to vary considerably. Accordingly, the circuit 5E automatically adjusts the level of the signal transmitted along the line by means of a negative feedback loop of variable gain GE varying in dependence on comparisons of the signal level leaving the attenuator 6E and two predetermined level thresholds.

The reproduction level controlling circuit 5R carries out a similar function to the circuit 5E, in dependence on the attenuation of the signal RECU between the far end speaker and the local speaker via the telephone network. However, the gain GR produced by the circuit 5R can be adjusted by the locutor, conventionally by means of a potentiometer included in the circuit 5R.

The values of the gains GR and GE are issued in digital form to the attenuation controlling circuit 7 in order to calculate a constant global attenuation:

$$A = N - GR - GE \text{ in dB,}$$

where N is a constant that depends on the telephone set and that ensures the latter's reproducing stability. Subsequently, the values of the gain, attenuation and signal levels are expressed in dB.

The global attenuation A is equal to the sum of the variable attenuations AR and AE transmitted in digital form by the circuit 7 to the attenuators 6R and 6E, i.e., A=AR+AE. This attenuation A is applied to the acoustic coupling so as to reduce the echo level ECR while ensuring stability between the signals RECU and EMIS irrespective of the state of convergence ETAT.

The circuit 7 also receives the logic signals LR and LE respectively supplied by the vocal activity detectors 2R and 2E, of which at least one, the signal LE, depends on the state of convergence ETAT.

The attenuation values AR and AE are calculated by the circuit 7 according to the following four relations:

if LR="1" and LE(ETAT)="0", i.e., if the far end speaker is speaking alone,
then AR and AE rapidly tend towards 0 and A respectively;

if LR="0" and LE(ETAT)="1", i.e., if the local speaker is speaking alone, therefore without any echo, MICRO=PM,
then AR and AE rapidly tend towards A and 0 respectively;

if LR="1" and LE(ETAT)="1", i.e., if both the far end speaker and the local speaker are speaking, therefore with an echo,
then AR and AE slowly tend towards A/2;

if LR="0" and LE(ETAT)="0", i.e., if neither the far end speaker nor the local speaker is speaking,
then AR and AE slowly tend towards A/2.

According to the invention, the control of the attenuations that is carried out in the attenuators 6R and 6E by the circuit 7 therefore depends on the thresholds SR and SE(ETAT) in the detectors 2R and 2E, and does not depend on a comparison of the signals in the channels, in this instance the signals RECU and RESIDU, as in the prior art. Furthermore, the value of the global attenuation A does not depend on the performances of the echo canceller 3, i.e., on the level of ECR-ECES, but on the envelopes of the channel signals in the detectors 2R and 2E and particularly on the values of these signals.

According to FIG. 3, the levels of the signals leaving the channels are then as follows:

$$DIFFUSE = RECU + GR - AR \text{ in dB}$$

$$EMIS = RESIDU + GE - AE \text{ in dB.}$$

The embodiments illustrated in FIGS. 2 and 3 comprise integrated digital circuits that are distinct for carrying out the different functions inherent in the processing of the echo and gain of the signals RECU and EMIS. However, as most of the circuits make calculations, such as the circuits 32, 41, 42, 43 and 7, they can be grouped together in the form of a microprocessor.

What we claim is:

1. A device for processing a real echo between first and second transmission channels, said device comprising echo cancellation means coupled to said first channel to be responsive to a first signal in said first channel and coupled to said second channel to be responsive to a second signal and said real echo in said second channel for producing a third signal containing components representing said second signal and a difference between said real echo and an estimated echo, said estimated echo resulting from a real echo identified by adaptive filtration in said echo cancellation means from said first and third signals, means for detecting in said third signal said components representing the difference between the real echo and estimated echo and said second signal only in response to the level of said third signal being greater than a first threshold, said components representing the difference between the real echo and estimated echo and said second signal being detected by correlation of said first and third signals and adaptation gain controlling means for gain-controlling the adaptation in the filtration of said echo cancelling means for modifying the adaptation gain while the second signal is detected as not being present in the second channel and for inhibiting filtration modification while said second signal is detected as being present in the second channel.

2. The device claimed in claim 1, wherein said detecting means comprise first means for producing a signal indicative of an envelope of said first signal, second means for producing a signal indicative of an envelope of said third signal, and means responsive to both said envelope indicating signals for deriving an indication of a short-term correlation between said envelopes to thereby derive a signal representing the presence of said second signal in said third signal, the signal indicating the presence of said second signal in said third signal being coupled to and controlling said adaptation gain controlling means in response to said correlation being less than a threshold.

3. The device claimed in claim 1, wherein said detecting means comprises means for producing a signal indicative of an envelope of said first signal, and means for analyzing a short-term correlation between said envelope and the modulus of an identification algorithm correction vector supplied by said echo cancelling means to thereby signal the presence of said second signal in said third signal to said adaptation gain controlling means in response to said correlation being less than a threshold.

4. The device claimed in claim 1, wherein said adaptation gain controlling means comprises means responsive to said detecting means for determining a state of convergence of the filtration in said cancelling means as a function of said first and third signals so that said adaptation gain decreases in response to said detecting means signalling that the contribution of said echo difference in said third signal decreases, and does not detect second signal in said third signal, and so that the adaptation gain increases in response to said detecting means signalling that the contribution of said echo difference in said third signal increases.

5. The device claimed in claim 4, wherein said first threshold is variable and depends on said state of convergence.

6. The device claimed in claim 2, wherein
said adaptation gain controlling means comprises means responsive to said detecting means for determining a state of convergence of the filtration in said cancelling means as a function of said first and third signals so that said adaptation gain decreases in response to said detecting means signalling that the contribution of said echo difference in said third signal decreases, and does not detect second signal in said third signal, and so that the adaptation gain increases in response to said detecting means signalling that the contribution of said echo difference in said third signal increases, said first and second means for producing signals indicative of the envelopes of the first and third signals means comparing said signal indicative of the envelope of said third signal with said first predetermined threshold, and said signal indicative of the envelope of said first signal with a second predetermined threshold, and
at least one of said first and second thresholds being variable as a function of said state of convergence.

7. The device claimed in claim 6, wherein said variable threshold increases and decreases in response to said state of convergence increasing and decreasing respectively.

8. A device as claimed in claim 1, comprising a first attenuator having a first attenuation and included in said first channel for attenuating said first signal, a second attenuator having a second variable attenuation and included in said second channel for attenuating said third signal, and means for controlling said first and second variable attenuations in said attenuators as a function of the results of independent comparisons between said first signal and a second predetermined threshold and between said third signal and said first threshold, said comparisons being made by said detecting means.

9. The device as claimed in claim 8, wherein the sum of said first and second attenuations is a constant value and wherein, for said first and second attenuations expressed in decibels,
said first and second attenuations rapidly tending towards zero and said constant value respectively in response to said first signal being greater than said second threshold and said third signal being less than said first threshold,
said first and second attenuations rapidly tending towards said constant value and zero respectively in response to said first signal being less than said second threshold and said third signal being greater than said first threshold,
both said first and second attenuations slowly tending towards half said constant value in response to said first and third signals being respectively more than said second and first thresholds, and
both said first and second attenuations slowly tending towards half said constant value in response to said first and third signals being respectively less than said second and first thresholds.

10. The device claimed in claim 8, wherein
said adaptation gain controlling means comprises means connected to said detecting means for determining a state of convergence of the filtration in said cancelling means as a function of said first and third signals so that said adaptation gain decreases in response to said detecting means signalling that the contribution of said echo difference in said third signal decreases, and does not detect the second signal in said third signal, and so that the adaptation gain increases in response to said detecting means signalling that the contribution of said echo difference in said third signal increases, and
at least one of said first and second thresholds depending on said convergence filtration state supplied by said adaptation gain controlling means.

11. The device as claimed in claim 8,
comprising a first adjustable amplification means included in said first channel for controlling a first gain of said attenuation controlling means the first adjustable amplification means amplifying said first signal before it is attenuated by said first attenuator, and a second adjustable amplification means included in said second channel for controlling a second gain of said attenuation controlling means, the second adjustable amplification means amplifying said third signal after it is attenuated by said second attenuator, the sum of said first and second attenuations being proportional to the sum of said first and second gains.

12. The device of claim 1 wherein the second signal is detected as being present and not being present in the second channel in response to the third signal.

13. A telephony device comprising:
a first channel in which is developed a first voice representing signal;
a second channel coupled with the first channel and in which is developed a second signal including a first component that is a replica of the first voice signal and a second component representing an actual echo in the second signal;
means responsive to the first voice representing signal for deriving an echo estimate component;
means responsive to the echo estimate component, the first component and the second component for deriving a third signal having a magnitude representing the first component and the deviation between the actual echo and the echo estimate component, the magnitude representing the first component and the deviation between the actual echo and the echo estimate component being derived by correlation of said first and third signals, the third signal being coupled to the means for deriving the echo estimate component for controlling the echo estimate component;

means responsive to the third signal for detecting the presence and absence of a voice signal in the second channel and for controlling the gain of the echo estimate component deriving means so that the echo estimate component is varied in amplitude as a function of the amplitude of at least one of the voice representing signals in response to the second signal being detected as being absent from the second channel and for not varying the echo estimate component in response to the second signal being detected as being present in the second channel.

14. A telephony device for processing a real echo between a first channel in which is developed a first voice representing signal and a second channel coupled with the first channel and in which is developed a second signal including a first component that is a replica of the first voice signal and a second component representing an actual echo in the second signal;

the processing device comprising:

means responsive to the first voice representing signal for deriving an echo estimate component;

means responsive to the echo estimate component, the first component and the second component for deriving a third signal having a magnitude representing the first component and the deviation between the actual echo and the echo estimate component, the third signal being coupled to the means for deriving the echo estimate component for controlling the echo estimate component, the magnitude representing the first component and the deviation between the actual echo and the echo estimate component being derived by correlation of said first and third signals;

means responsive to the third signal for detecting the presence and absence of a voice signal in the second channel and for controlling the gain of the echo estimate component deriving means so that the echo estimate component is varied in amplitude as a function of the amplitude of at least one of the voice representing signals in response to the second signal being detected as being absent from the second channel and for not varying the echo estimate component in response to the second signal being detected as being present in the second channel.

15. The device of claim 1 wherein the correlation is a short term correlation.

16. The device of claim 13 wherein the correlation is a short term correlation.

17. The device of claim 14 wherein the correlation is a short term correlation.

18. The device of claim 1 wherein the correlation is a short term correlation of the envelopes of the first and third signals.

19. The device of claim 13 wherein the correlation is a short term correlation of the envelopes of the first and third signals.

20. The device of claim 14 wherein the correlation is a short term correlation of the envelopes of the first and third signals.

* * * * *